(12) United States Patent
Grivetti et al.

(10) Patent No.: US 10,384,438 B2
(45) Date of Patent: Aug. 20, 2019

(54) CONSTRUCTION SYSTEM

(71) Applicant: Caterpillar Inc., Peoria, IL (US)

(72) Inventors: Tazio S. Grivetti, Chillicothe, IL (US); Kevin A. O'Neil, Raleigh, NC (US); Joseph M. Spanier, Metamora, IL (US); Christopher M. Sketch, Peoria, IL (US); John Sherman, Peoria, IL (US); James Babin, Glasford, IL (US)

(73) Assignee: Caterpillar Inc., Deerfield, IL (US)

( * ) Notice: Subject to any disclaimer, the term of this patent is extended or adjusted under 35 U.S.C. 154(b) by 230 days.

(21) Appl. No.: 15/061,238

(22) Filed: Mar. 4, 2016

(65) Prior Publication Data

US 2017/0255202 A1 Sep. 7, 2017

(51) Int. Cl.
| | |
|---|---|
| *G05D 1/02* | (2006.01) |
| *B33Y 30/00* | (2015.01) |
| *B33Y 80/00* | (2015.01) |
| *B62D 12/02* | (2006.01) |
| *E04G 21/04* | (2006.01) |
| *B29C 64/106* | (2017.01) |

(52) U.S. Cl.
CPC ............ *B33Y 30/00* (2014.12); *B29C 64/106* (2017.08); *B33Y 80/00* (2014.12); *B62D 12/02* (2013.01); *G05D 1/0238* (2013.01); *E04G 21/04* (2013.01); *G05D 2201/0202* (2013.01)

(58) Field of Classification Search
CPC ..... B33Y 30/00; B33Y 50/02; B29C 67/0088; B62D 6/00
USPC .......................................................... 701/41
See application file for complete search history.

(56) References Cited

U.S. PATENT DOCUMENTS

| | | | |
|---|---|---|---|
| 2006/0230646 A1* | 10/2006 | Schmidt ................ | E02F 3/7609 37/381 |
| 2011/0035140 A1 | 2/2011 | Candy | |
| 2013/0051913 A1 | 2/2013 | Eul | |
| 2015/0045992 A1 | 2/2015 | Ashby et al. | |
| 2015/0192919 A1 | 7/2015 | Sketch et al. | |

FOREIGN PATENT DOCUMENTS

CN 104708702 6/2015

* cited by examiner

*Primary Examiner* — Maceeh Anwari
(74) *Attorney, Agent, or Firm* — Bookoff McAndrews (57) ABSTRACT

A construction system is provided. The construction system includes at least one machine. The construction system also includes a gantry system having a beam member. The construction system further includes a reference member provided proximal to a predetermined path of the at least one machine. The construction system includes a sensing unit associated with the at least one machine. The sensing unit is configured to determine distance of a portion of the at least one machine from the reference member. The construction system also includes a control unit in communication with the at least one machine and the sensing unit. The control unit is configured to receive inputs indicative of distance of the portion of the at least one machine from the reference member. The control unit is also configured to move the at least one machine to move the gantry system along the reference member for a predetermined distance.

20 Claims, 7 Drawing Sheets

CONSTRUCTION SYSTEM

TECHNICAL FIELD

The present disclosure relates to a construction system and more particularly to a construction system and a method of operating the construction system.

BACKGROUND

A gantry system is used for constructing structures, such as buildings, towers, etc. Typically, the gantry system includes a pair of rails, a beam member, and a dispensing system. The pair of rails, being positioned on a ground surface, is stationary and the beam member extends between the pair of rails. The dispensing system is movable on the beam member. Typically, the pair of rails and the beam member remain stationary with respect to the ground surface, while a control unit controls the movement of the dispensing system on the beam member. As per the required movement, the dispensing system dispenses material to build the structures. As such, the gantry system requires considerable time to set up, as the pair of rails and the beam member are required to be installed at a site where construction of the structures is desired. Further, such setting up of the gantry system requires skilled personnel, thereby involving additional time and cost.

U.S. Patent Publication Number 2015/0045992 discloses a robotic control system for a vehicle having a chassis and a drive system. The robotic control system includes a control unit configured to control the drive system. The control unit is further configured to do at least one of the following activities, such as auto-loading the vehicle onto a trailer, precluding tipping of the vehicle, stabilizing yaw of the vehicle, simulating Ackerman steering, balancing the vehicle on two wheels, retrieving an other vehicle, transferring a payload from the vehicle to the other vehicle, coupling of at least one other vehicle to the vehicle, retrieving or moving a container using either relative sensing or absolute position referencing, and profile cutting of plants and 3D print cement.

SUMMARY OF THE DISCLOSURE

In one aspect of the present disclosure, a construction system is provided. The construction system includes at least one machine. The construction system also includes a gantry system having a beam member. The beam member is supported at a first end on the at least one machine. The construction system further includes a reference member provided proximal to a predetermined path of the at least one machine. The construction system includes a sensing unit associated with the at least one machine. The sensing unit is configured to determine distance of a portion of the at least one machine from the reference member. The construction system also includes a control unit in communication with the at least one machine and the sensing unit. The control unit is configured to receive inputs indicative of distance of the portion of the at least one machine from the reference member. The control unit is also configured to move the at least one machine to move the gantry system along the reference member for a predetermined distance.

In one aspect of the present disclosure, a method of operating a construction system is provided. The construction system includes at least one machine supporting a gantry system. The method includes determining distance of a portion of the at least one machine from a reference member. The method also includes moving the at least one machine to move the gantry system along the reference member for a predetermined distance.

In yet another aspect of the present disclosure, a method of operating a construction system is provided. The construction system includes at least one machine supporting a gantry system. The method includes determining distance of a first portion of the at least one machine from a reference member. The method also includes determining distance of a second portion of the at least one machine from a reference member. The method further includes comparing the distance of the second portion of the at least one machine from the reference member and the distance of the first portion of the machine from the reference member. The method includes moving the at least one machine to move the gantry system, along the reference member for a predetermined distance. The method also includes steering the at least one machine upon determining a predefined deviation between the distance of the second portion of the at least one machine from the reference member and the distance of the first portion of the machine from the reference member.

Other features and aspects of this disclosure will be apparent from the following description and the accompanying drawings.

DETAILED DESCRIPTION

Figure 1:
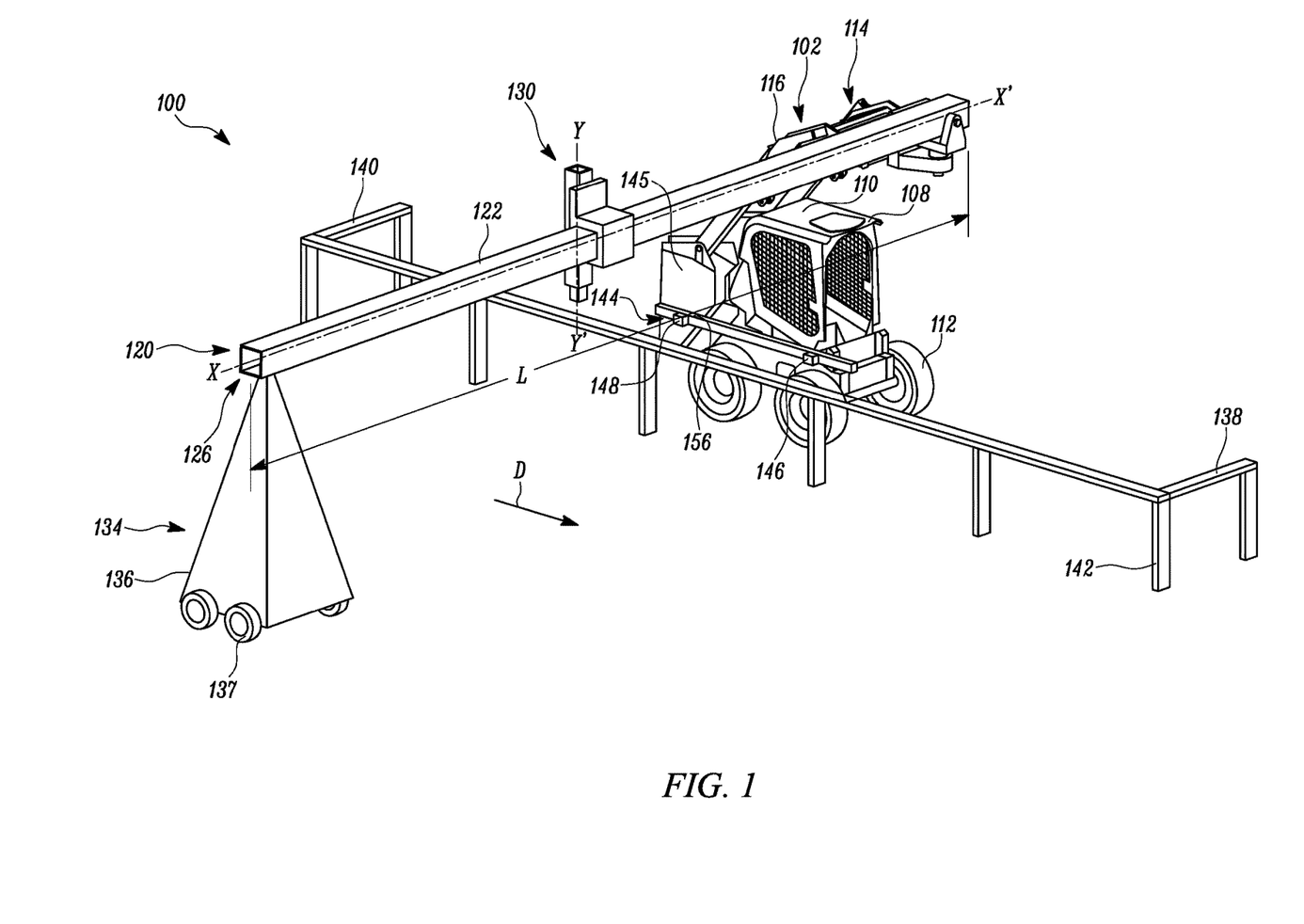
FIG. 1 is a perspective view of a construction system, according to one embodiment of the present disclosure.

Wherever possible, the same reference numbers will be used throughout the drawings to refer to the same or the like parts. FIG. 1 is a perspective view of an exemplary construction system 100, according to one embodiment of the present disclosure. The construction system 100 includes at least one machine, such as a machine 102. The machine 102 may include or be part of a mobile vehicle. For example, the machine 102 may include, but is not limited to, track type loaders, multi-terrain loaders, compact track loaders, mining shovels, wheel loaders, back hoe loaders, motor graders, track type tractors, wheeled tractors, pavers, excavators, material handlers, forestry machines, or any other type of machine, mobile or stationary. For simplicity purposes, the machine 102 is shown and described as a skid steer loader.

The machine 102 includes a body 104 having upright stanchions or tower portions (not shown) on a left side and a right side of the machine 102, and an operator station 108. A roof 110 of the machine 102 is defined on top of the operator station 108 of the machine 102. Further, the machine 102 includes drive wheels 112 that are mounted to the body 104 and are powered by a power source (not shown), such as an engine (not shown) of the machine 102. The engine is mounted to the body 104 rearward of the operator station 108 in an engine enclosure (not shown).

The drive wheels 112 are driven in a manner traditionally known in the art. However, in an alternative embodiment, the drive wheels 112 may be replaced by left and right endless belts or track assemblies (not shown), or any other type of drive system known in the art. For example, the machine 102 may be embodied as a tracked machine. The machine 102 includes a linkage assembly 114. The linkage assembly 114 includes lift arms 116 pivotably mounted on the left and right side of the body 104. The machine 102 may also include a work implement (not shown), such as a bucket, pivotally mounted at a front end of the lift arms 116.

The construction system 100 includes a gantry system 120. In one example, the gantry system 120 is a Three Dimensional (3D) construction gantry system. The gantry system 120 includes a beam member 122. The beam member 122 includes a first end 124 and a second end 126. The first end 124 of the beam member 122 is supported on the machine 102. More particularly, the first end 124 of the beam member 122 may be supported by the linkage assembly 114, the work implement, or the roof 110 of the machine 102. In the embodiment illustrated in FIG. 1, the first end 124 of the beam member 122 is supported on the roof 110 of the machine 102.

The gantry system 120 includes a first coupler 128. The first coupler 128 removably couples the first end 124 of the beam member 122 with the linkage assembly 114. The first coupler 128 may be embodied as a pillar structure. The first coupler 128 extends along a first axis X-X'. It should be noted that a height of the beam member 122 of the gantry system 120 may remain fixed during formation of one construction layer at a construction site, and may be changed during formation of a subsequent construction layer. In another example, the work implement may be moved to dynamically adjust the height of the beam member 122 during the formation of a single layer at the construction site.

The construction system 100 also includes an auxiliary machine 134. The auxiliary machine 134 supports the second end 126 of the beam member 122. The auxiliary machine 134 moves with the machine 102. In one example, the auxiliary machine 134 is embodied as an A-frame support 136 movable on a set of wheels 137. The A-frame support 136 may be made of a metal or a non-metal, based on system requirements. A weight of the A-frame support 136 is decided based on a weight and dimensions of the beam member 122. The machine 102 and the A-frame support 136 together support either ends 124, 126 of the beam member 122 so that the beam member 122 remains horizontal in operation.

It should be noted that the second end 126 of the beam member 122 may be supported by any another auxiliary machine apart from the A-frame support 136, without limiting the scope of the present disclosure. In another embodiment illustrated in FIG. 3, a second end 226 of a beam member 222 may be supported by a second machine 204. In such an embodiment, the construction system 200 includes a first machine 202 (as the machine 102) and a second machine 204. The first machine 202 and the second machine 204 may be similar or different from each other. In one example, the first and second machines 202, 204 may be similar to the machine 102 shown in FIG. 1. Accordingly, the first and second machines 202, 204 may include a skid steer loader. Alternatively, the first and second machines 202, 204 may embody any other wheeled or tracked machine known in the art.

In another embodiment, the construction system 100 may only include one machine 102 which supports the gantry system 130. Specifically, in this embodiment, the first end 124 of the beam member 122 is supported by the machine 102. In case the gantry system 130 is short for example of two or three feet like a wall builder, the gantry system 130 may be supported on the machine 102, and can be configured to move along a straight or limited undulated path.

Figure 3:
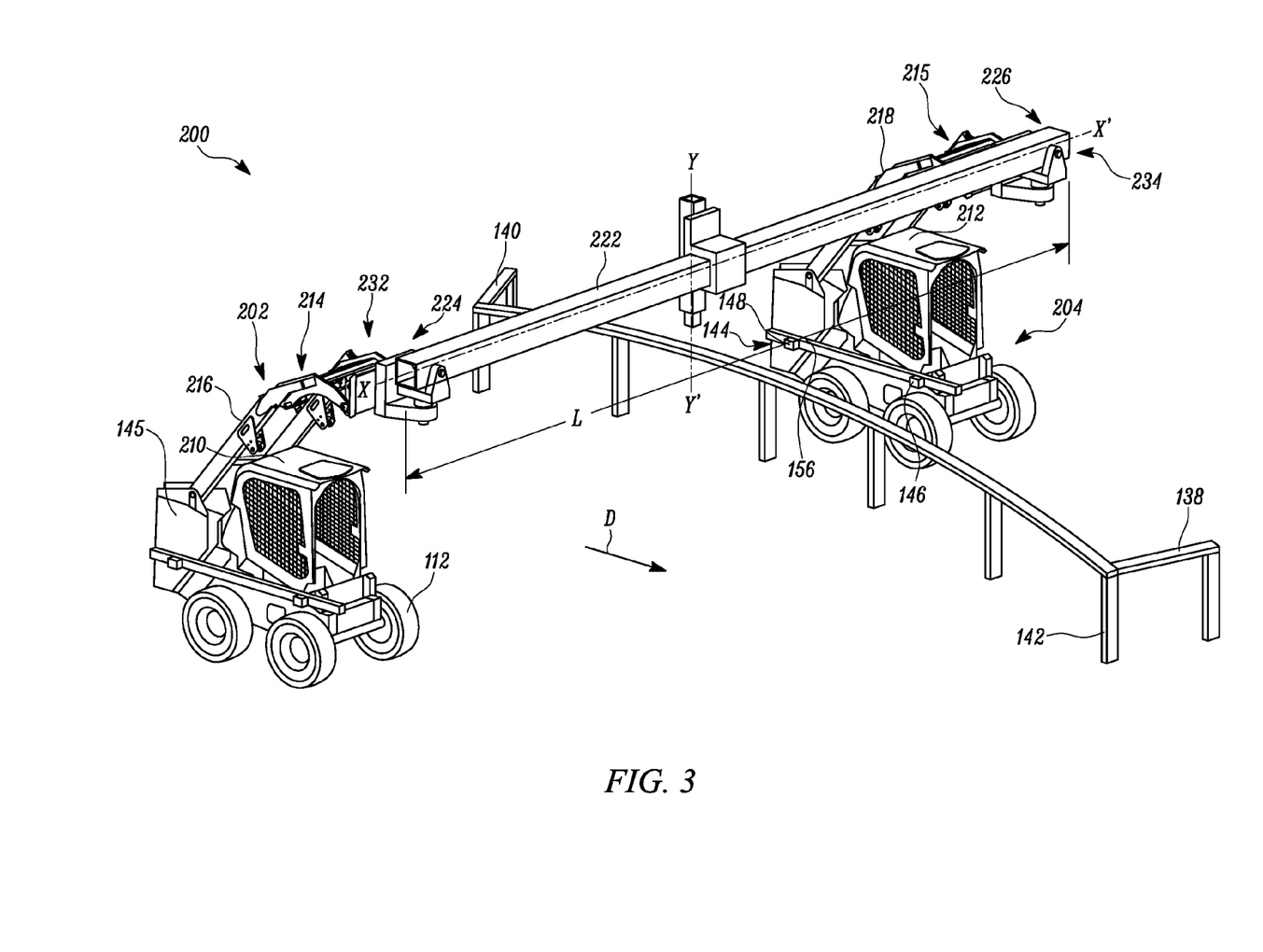
FIG. 3 is a perspective view of a construction system, according to another embodiment of the present disclosure.

In the illustrated embodiment, the first coupler 232 removably couples a first end 224 of the beam member 222 with lift arms 216 of a linkage assembly 214 of the first machine 202. Further, a second coupler 234 removably couples the second end 226 of the beam member 222 with lift arms 218 of a linkage assembly 215 of the second machine 204. In another example, the first and second coupler 232, 234 may be removably coupled to the work implement or roof 210, 212 of the first and second machines 202, 204, respectively, without limiting the scope of the present disclosure.

Referring again to FIG. 1, the gantry system 120 includes a dispensing system 130. The dispensing system 130 is adapted to dispense construction material during a construction event, for example construction of a wall. The dispensing system 130 is coupled to the beam member 122. The dispensing system 130 is movable along a length "L" of the beam member 122 and along a Y-Y' axis. In one example, the dispensing system 130 is embodied as an extruder. The dispensing system 130 may embody any known system/equipment that allows dispensing of the construction material. For the 3D construction gantry system, the dispensing system 130 may be embodied as a print head.

Further, the dispensing system 130 may be movable along the first axis X-X' with respect to the beam member 122 of the gantry system 120. More particularly, the dispensing system 130 may be moved about the first axis X-X' as per requirements for formation of various construction layers. The dispensing system 130 may be powered and operated by a hydraulic system or a pneumatic system or an electrical system of the machine 102. Further, the hydraulic, electric and/or pneumatic system of the machine 102 may also be utilized to move the dispensing system 130 along the first axis X-X' and along the length "L" of the beam member 122.

The construction system 100 further includes a set of limiting members, such as a first limiting member 138 and a second limiting member 140, provided proximal to a predetermined path of the machine 102. The first and second limiting members 138, 140 are spaced apart from each other. In one example, the first and second limiting members 138, 140 are positioned parallel to each other. In the illustrated embodiment, the first and second limiting members 138, 140 are embodied as rectangular shaped plates. However, the first and second limiting members 138, 140 may be embodied as square shaped plates. In another example, the first and second limiting members 138, 140 may be embodied as poles, walls or any other upstanding structure.

The construction system 100 also includes a reference member 142. The reference member 142 is provided proximal to the predetermined path of the machine 102. The profile of the reference member 142 may be dependent upon the predetermined path of the machine 102. More particularly, the reference member 142 is provided along a wall of a structure to be constructed by the construction system 100. The reference member 142 extends between the first and second limiting members 138, 140. In the illustrated example, the reference member 142 is perpendicular to each of the first and second limiting members 138, 140. Alternatively, the reference member 142 may be curved, inclined or angled with respect to the first and second limiting members 138, 140.

In the illustrated embodiment, the reference member 142 is embodied as a rectangular plate member. The rectangular plate member may be made of a metal or a non-metal, without any limitations. In another example, the reference member 142 may be embodied as a longitudinal upstanding member or a string coupled to each of the limiting members 138, 140 at either ends. Further, the string may be made of a metal or a non-metal. For example, the string may embody a metal wire, a nylon rope, and the like. In an example, the reference member 142 may be composed of wooden boards which are two inches thick, four inches tall, and the length could be eight feet or longer. The wooden boards may be attached to multiple stakes pounded in the ground.

Figure 2:
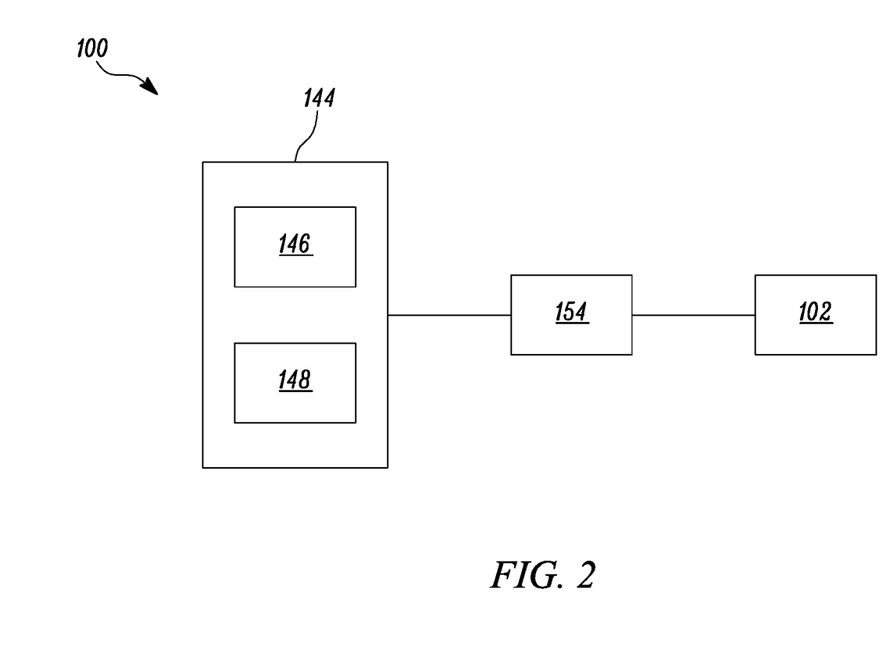
FIG. 2 is a block diagram of the construction system.
Figure 4:
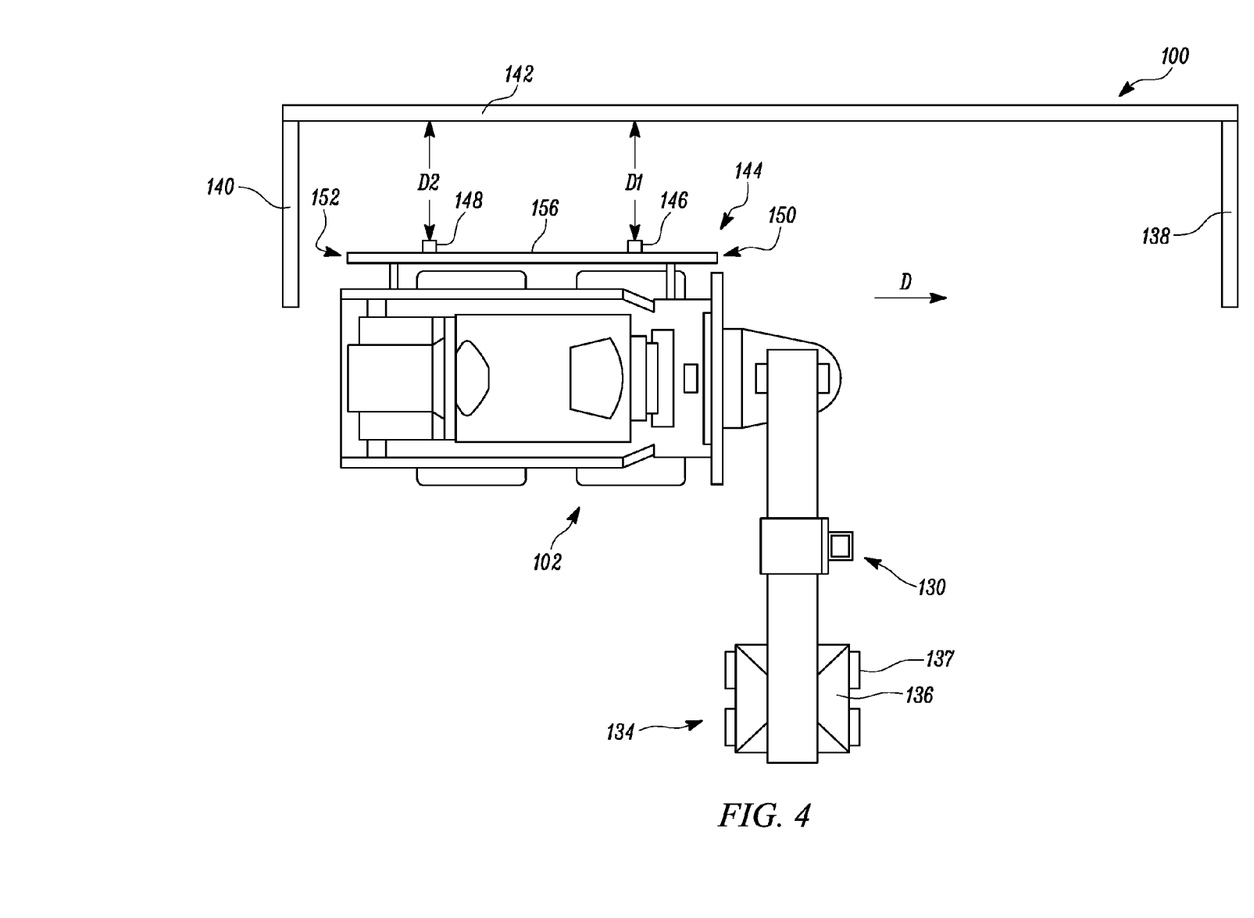
FIG. 4 is a top view of the construction system of FIG. 1.
Figure 5:
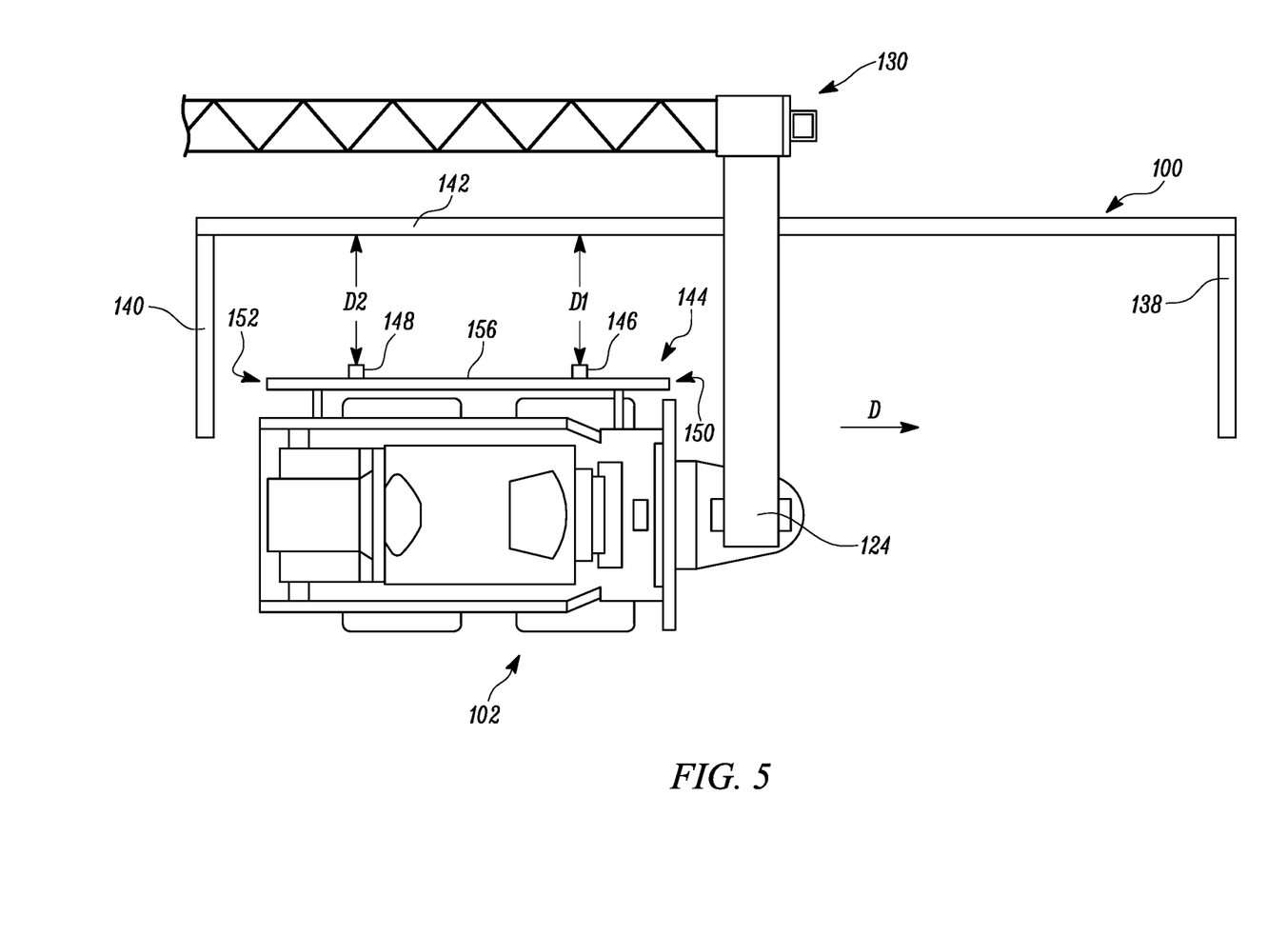
FIG. 5 is a top view of the construction system, according to another embodiment of the present disclosure

Referring now to FIGS. 1, 2 and 4, the construction system 100 includes a sensing unit 144 communicably associated with the at least one machine e.g. the machine 102. The sensing unit 144 is adapted to determine a distance between one or more portions of the machine 102 and the reference member 142. In an example, the sensing unit 144 is adapted to determine a distance between at least two distant portions of the machine 102, for example two distant portion on a side portion 145 of the machine 102 which is proximate to the reference member 142. The sensing unit 144 includes a plurality of sensors, such as, a first sensor 146 and a second sensor 148. The first and second sensors 146, 148 are mounted on a panel 156. The panel 156 is in turn coupled to the side portion 145 of the machine 102. The panel 156 may embody a rectangular bar member made of a metal or a non-metal. In alternative embodiments, the panel 156 may mounted on any other portion of the machine 102 facing the reference member 142. Alternatively, the plurality of sensors, such as the first sensor 146 and the second sensor 148, may be mounted directly on the machine 102. In such a case the distance between the first sensor 146 and the second sensor 148, may be accordingly calibrated. Further in such a case the distance between the first sensor 146 and the second sensor 148 with respect to the reference member 142 may be also be accordingly calibrated.

The first sensor 146 is positioned at a first portion 150 of the machine 102. The first sensor 146 generates a first input indicative of a first distance (D1) between the first portion 150 of the machine 102 and the reference member 142. Further, the second sensor 148 is positioned at a second portion 152 of the machine 102. The second portion 152 is distant from the first portion 150 of the machine 102. The second sensor 148 generates a second input indicative of a second distance (D2) between the second portion 152 of the machine 102 and the reference member 142.

The first and second sensors 146, 148 may include any one or a combination of sonic sensors, laser sensors, contact sensors, and the like. In one example, the first and second sensors 146, 148 may include proximity sensor. It should be noted that the first and second sensors 146, 148 may include any other type of sensor that is capable of generating signals indicative of the distance between the first portion 150 of the machine 102 and the reference member 142 and/or the second portion 152 of the machine 102 and the reference member 142. It should also be noted that additional sensors can be added to increase the control of the system 100. These sensors can determine distance to the reference member 142, the limiting members 138 and 140.

The construction system 100 includes a control unit 154 (see FIG. 2). The control unit 154 is in communication with the machine 102. In one example, the control unit 154 is in communication with a steering unit (not shown) of the machine 102, and is therefore configured to steer the machine 102, as and when required. Further, the control unit 154 is also in communication with the first and second sensors 146, 148 of the sensing unit 144 to continuously receive first and second inputs indicative of the first distance (D1) and the second distance (D2) from the first sensor 146 and the second sensor 148, respectively. The control unit 154 is also configured to determine a direction of movement of the machine 102.

The control unit 154 is configured to compare the first and second inputs indicative of the first distance (D1) and the second distance (D2). The control unit 154 further generates an input indicative of a change in the first or second distances between the first or second portions 150, 152 of the machine 102 and the reference member 142, when the machine 102 is moving in a direction of travel "D". The control unit 154 also generates inputs to move the machine 102 and accordingly move the gantry system 120 along the reference member 142 for a predetermined distance. Therefore, as long as the first distance (D1) is equal to the second distance (D2), the control unit 154 continues to generate inputs to allow movement of the machine 102 along the reference member 142 for the predetermined distance.

Further, the control unit 154, upon determining that the first distance (D1) has decreased from with respect to the second distance (D2) (i.e. D1<D2), may compare the difference between the first distance (D1) and the second distance (D2) to determine a difference value. The control unit 154 may thereafter compare the difference value with a threshold change of distance between the first or second portions 150, 152 of the machine 102 and the reference member 142. The threshold change of distance may be defined as a change of distance below which steering of the machine 102 is undesired, and beyond which steering of the machine 102 will be desired. In an example, the threshold change of distance may be 0.01 millimeter. In such an example, when the control unit 154 determines that the distance between the portion 150 of the machine 102 and the reference member 142 is below the threshold change of distance of 0.01 millimeter, the control unit 154 may continue to generate inputs to move the machine 102 and accordingly move the gantry system 120 along the reference member 142 for the predetermined distance.

However, when the control unit 154 determines that the difference value is above the threshold change of distance, the control unit 154 may generate an input indicative of change in distance of the portion 150 of the machine 102 and the reference member 142. Thereafter, the control unit 154 may steer the machine 102 in a first direction i.e. away from the reference member 142, based on the input indicative of the change in distance. In such a case, the control unit 154 may steer the machine 102 in the first direction so that the first distance (D1) becomes equal to the second distance (D2) (i.e. D1=D2). Likewise, the control unit 154, upon determining that the first distance (D1) has increased with respect to the second distance (D2) (i.e. D1>D2), steers the machine 102 in direction opposite to the first direction, i.e. towards the reference member 142. Again, in such a case, the control unit 154 may steer the machine 102 in the direction opposite to the first direction so that the first distance (D1) becomes equal to the second distance (D2) (i.e. D1=D2).

More specifically, in one example, where the direction of travel "D" corresponds to a forward direction of the machine 102, the control unit 154 receives the first input indicative of the first distance (D1), from the first sensor 146. Further, the control unit 154 generates the input indicative of the change in the first distance (D1). The input is generated based on a comparison between the first distance (D1) and the second distance (D2).

In another example, the direction of travel "D" may correspond to the reverse direction of the machine 102. In such an example, the control unit 154 receives the second input indicative of the second distance (D2) from the second sensor 148 and generates the input based on a comparison between the second distance (D2) and the first distance (D1). Further, the control unit 154, upon determining that the second distance (D2) has decreased from with respect to first distance (D1) (i.e. D2<D1), steers the machine 102 in direction opposite to the first direction i.e. towards the reference member 142, so that the second distance (D2) becomes equal to the first distance (D1) (i.e. D2=D1). Likewise, the control unit 154, upon determining that the second distance (D2) has increased from the first distance (D1) (i.e. D2>D1), steers the machine 102 in a first direction i.e. away from the reference member 142, so that the second distance (D2) becomes equal to the first distance (D1) (i.e. D2=D1.

The control unit 154 is further adapted to determine a distance of the first or second portions 150, 152 of the machine 102 from the first and second limiting members 138, 140, respectively. More particularly, when the machine 102 is moving in the forward direction, the control unit 154 determines a distance between the first portion 150 of the machine 102 and the first limiting member 138. Further, when the machine 102 is moving in the reverse direction, the control unit 154 determines a distance between the second portion 152 of the machine 102 and the second limiting member 140. The control unit 154 compares the distance between the first portion 150 or the second portion 152 and the corresponding first limiting member 138 or the second limiting member 140 of the machine 102 with a predefined threshold. In a situation where the distance between the first portion 150 or the second portion 152 and the corresponding first limiting member 138 or the second limiting member 140 of the machine 102 is below a predefined threshold, the control unit 154 restricts the movement of the machine 102 in the forward or reverse directions, respectively.

In one exemplary embodiment, the control unit 154 determines a distance travelled by the machine 102 in the forward or reverse directions. The control unit 154 may receive inputs from one or more sensors present onboard the machine 102 to determine the distance travelled by the machine 102. Further, the control unit 154 compares the distance travelled by the machine 102 with a predefined distance. The predefined distance corresponds to the distance to be covered by the machine 102 during a single construction event in the forward or reverse directions. The control unit 154 restricts the movement of the machine 102 along the reference member 142 upon determining that the distance travelled by the machine 102 is equal to the predefined distance.

INDUSTRIAL APPLICABILITY

Figure 6:
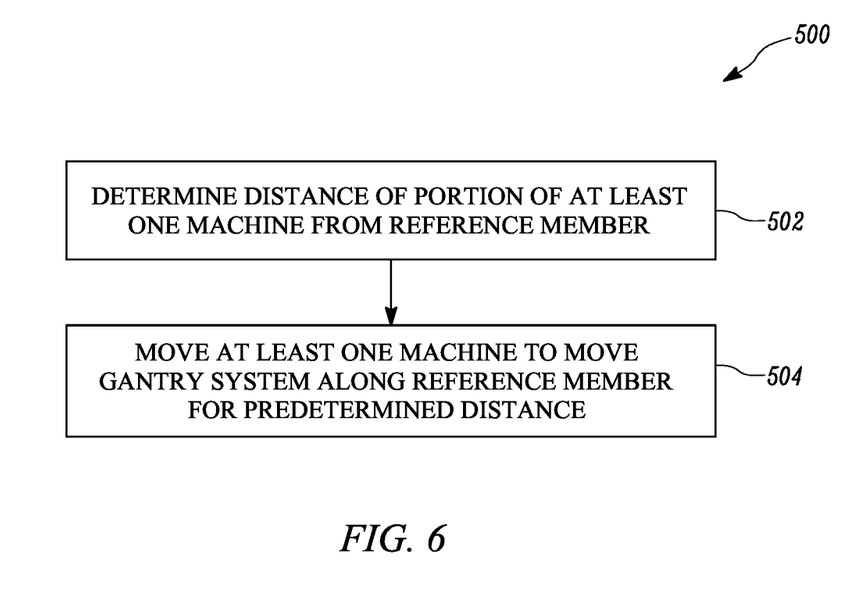
FIG. 6 is a flowchart for a method of operating the construction system having a machine supporting a gantry system, according to one embodiment of the present disclosure.

The present disclosure relates to a system and method for controlling the construction system 100, 200. FIG. 6 is a flowchart for a method 500 of operating a construction system, such as the construction system 100 or the construction system 200. The construction system may include at least one machine, such as the machine 102, 202, or 204, supporting the gantry system 130. At step 502, the method 500 includes determining distance of a portion of the at least one machine from a reference member 142. At step 504, the method 500 includes moving the at least one machine, such as the machine 102, 202, or 204, to move the gantry system 130 along the reference member 142 for the predetermined distance.

Figure 7:
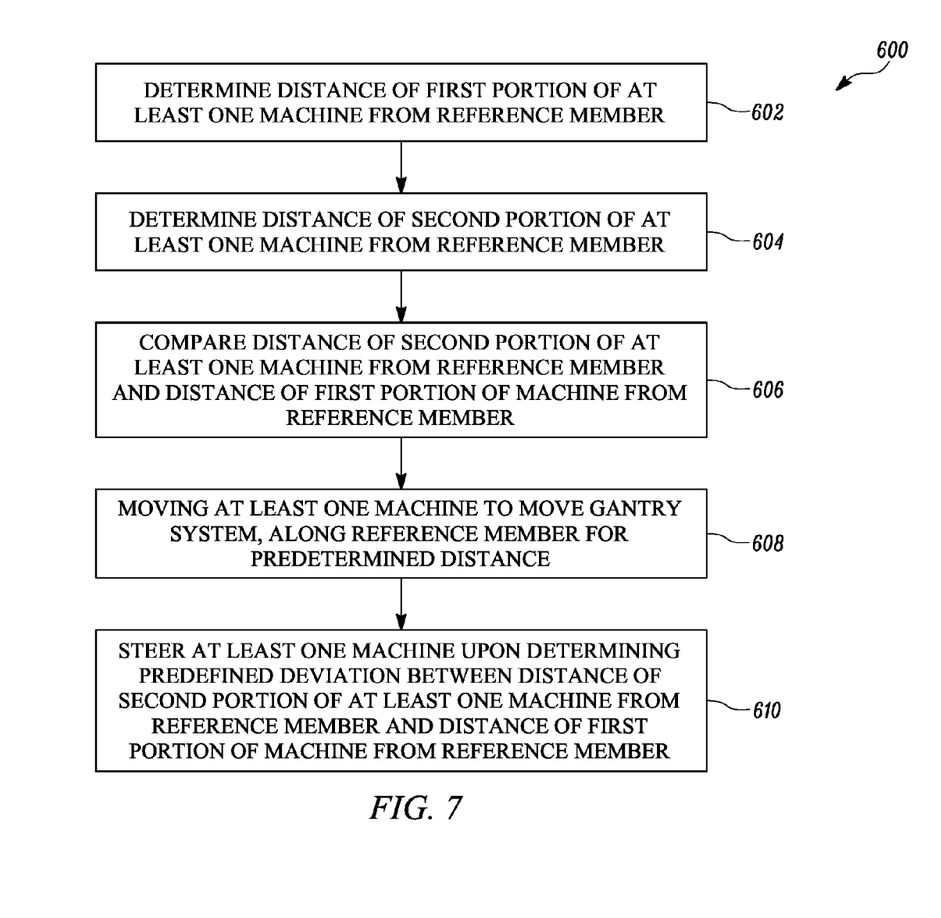
FIG. 7 is a flowchart for a method of operating the construction system having the machine supporting the gantry system; according to one embodiment of the present disclosure.

FIG. 7 is another flowchart for a method 600 of operating a construction system, such as the construction system 100 or the construction system 200. The construction system 100 may include at least one machine such as the machine 102, 202, or 204, supporting the gantry system 130. The method 600 initiates with the commencement of operation of the machine 102. At step 602, the method 600 includes determining distance of a portion such as a first portion 150 of the at least one machine from the reference member 142. At step 604, the method 600 includes determining distance of a second portion 152 of the at least one machine from the reference member 142. At step 606, the method 600 includes comparing the distance of the second portion 152 of the at least one machine from the reference member 142 and the distance of the first portion 150 of the machine 102 from the reference member 142. At step 608, the method 600 includes moving the at least one machine to move the gantry system 130, along the reference member 142 for the predetermined distance. Further, the method 600, at step 610 includes steering the at least one machine upon determining a predefined difference between the distance of the second portion of the at least one machine from the reference member 142 and the distance of the first portion of the machine from the reference member 142.

The construction system 100, 200 of the present disclosure provides a simple and cost effective solution to control the movement of at least one machine such as the machine 102, 202, or 204 associated with the construction system 100, 200. Since the construction system 100, 200 of the present disclosure is simple and easy to install, the construction system 100, 200 may be conveniently and quickly installed in different locations as per requirement. The construction system 100, 200 makes use of low cost sensors for controlling the movement of the machine 102, 202, 204. The construction system 100, 200 of the present disclosure follows a set of instructions stored in the control unit 154 and moves the at least one machine 102 and associated gantry system 120, dispensing system 130 to complete the construction of the 3D structure in a layer by layer fashion as per the set of instructions stored in the control unit 154.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A construction system comprising:
   at least one machine;
   a gantry system having a beam member and a dispensing system including a print head configured to dispense construction material coupled thereto, the beam member being supported at a first end on the at least one machine, wherein the gantry system is a Three Dimensional (3D) construction gantry system;
   a reference member provided proximal to a predetermined path of the at least one machine;

a sensor associated with the at least one machine, the sensor being configured to determine a distance of a portion of the at least one machine from the reference member; and a controller in communication with the at least one machine and the sensor, the controller being configured to:
electronically receive inputs from the sensor indicative of the distance of the portion of the at least one machine from the reference member; and
move the at least one machine to move the gantry system along the reference member on the predetermined path.

2. The construction system of claim 1, wherein the controller is further configured to:
steer the at least one machine in a first direction, and upon determining a threshold change of distance between the portion of the at least one machine and the reference member, steer the at least one machine in a direction opposite to the first direction.

3. The construction system of claim 2, wherein the controller is further configured to:
generate an input indicative of a change in distance of the portion of the at least one machine from the reference member, in the first direction; and
steer the at least one machine in the direction opposite to the first direction based on the input indicative of the change in distance.

4. The construction system of claim 1, further comprising a limiting member, wherein the controller is further configured to:
determine a distance of the portion of the at least one machine from the limiting member; and
restrict movement of the at least one machine along the reference member upon determining that the distance of the portion of the at least one machine from the limiting member is below a predefined threshold.

5. The construction system of claim 1, wherein the sensor is a first sensor positioned at a first portion of the at least one machine to generate a first input indicative of distance between the first portion of the at least one machine and the reference member; and
further including a second sensor positioned at a second portion distant from the first portion to generate a second input indicative of distance between the second portion of the at least one machine and the reference member,
wherein each of the first sensor and the second sensor is disposed in communication with the controller.

6. The construction system of claim 1, wherein the sensor comprises one or more of sonic sensors, laser sensors, and contact sensors.

7. The construction system of claim 1, further comprising an auxiliary machine supporting a second end of the beam member of the gantry system, the auxiliary machine being configured to move with the at least one machine, and the print head of the dispensing machine being located between the at least one machine and the auxiliary machine.

8. The construction system of claim 7, wherein the beam member is supported between the first end by a portion of the first machine and a second end by a portion of the auxiliary machine.

9. The construction system of claim 1, wherein the dispensing system includes an extrusion component, the dispensing system being movable along a length of the beam member; and wherein the dispensing system is operated by one of a hydraulic system, a pneumatic system, or an electrical system of the at least one machine.

10. A method of operating a construction system having at least one machine supporting a gantry system, the method comprising:
determining, by a first sensor, a distance of a portion of the at least one machine from a fixed reference member;
moving the at least one machine to move the gantry system relative to and along the fixed reference member for a predetermined distance; and
dispensing construction material via a dispensing system including a print head coupled to a beam member of the gantry system, the dispensing system being movable along a length of the beam member.

11. The method of claim 10, further comprising:
steering the at least one machine in a first direction, and upon determining a threshold change of distance between the portion of the at least one machine and the fixed reference member, steering the at least one machine in a direction opposite to the first direction.

12. The method of claim 11, further comprising:
generating an input indicative of change in distance of the portion of the at least one machine from the fixed reference member, in the first direction; and
steering the at least one machine in the direction opposite to the first direction based on the input indicative of the change in distance.

13. The method of claim 11, further comprising:
determining, by a second sensor, a distance of a second portion of the at least one machine from the fixed reference member;
comparing the distance of the second portion of the at least one machine from the fixed reference member and the distance of the portion of the at least one machine from the fixed reference member; and
steering the at least one machine upon determining a predefined difference between the distance of the second portion of the at least one machine from the fixed reference member and the distance of the portion of the at least one machine from the fixed reference member.

14. The method of claim 13, further comprising:
determining a direction of movement of the at least one machine;
identifying at least one of the distance of the second portion of the at least one machine from the fixed reference member or the distance of the portion of the at least one machine from the fixed reference member as a steering input indicative distance based on the direction of movement of the at least one machine; and
steering the at least one machine in a first direction, and upon determining a threshold change of the steering input indicative distance, steering the at least one machine in a direction opposite to the first direction.

15. The method of claim 10, further comprising:
generating an input indicative of the distance of the portion of the at least one machine from a limiting member; and
restricting movement of the at least one machine relative to and along the fixed reference member upon determining that the distance of the portion of the at least one machine from the limiting member is below a predefined threshold.

16. The method of claim 10, further comprising:
determining a distance travelled by the at least machine; and restricting movement of the at least one machine relative to and along the fixed reference member upon determining that the distance travelled by the at least one machine is equal to a predefined distance.

17. The method of claim 10, wherein the gantry system is a Three Dimensional (3D) construction gantry system, the method further including:

adjusting a vertical height of the beam member.

18. A method of operating a construction system having at least one machine supporting a gantry system, the method comprising:

determining, based on a first electronic signal generated by a first sensor, a distance of a first portion of the at least one machine from a fixed reference member;

determining, based on a second electronic signal generated by a second sensor, a distance of a second portion of the at least one machine from the fixed reference member;

comparing, by a controller, the distance of the second portion of the at least one machine from the fixed reference member and the distance of the first portion of the machine from the fixed reference member;

moving the at least one machine to move the gantry system, relative to and along the fixed reference member for a predetermined distance, wherein the gantry system is a Three Dimensional (3D) construction gantry system; and steering the at least one machine upon determining a predefined deviation between the distance of the second portion of the at least one machine from the fixed reference member and the distance of the first portion of the machine from the fixed reference member.

19. The method of claim 18, further comprising:

determining a direction of movement of the at least one machine;

identifying at least one of the distance of the second portion of the at least one machine from the fixed reference member or the distance of the first portion of the machine from the fixed reference member as a steering input indicative distance based on the direction of movement of the at least one machine; and steering the at least one machine in a first direction, and upon determining a threshold change of the steering input indicative distance, steering the at least one machine in a direction opposite to the first direction.

20. The method of claim 18, further comprising:

generating an input indicative of the distance of the first portion of the at least one machine from a limiting member; and restricting movement of the at least one machine relative to and along the fixed reference member upon determining that the distance of the first portion of the at least one machine from the limiting member is below a predefined threshold.

* * * * *